(12) United States Patent
Lair et al.

(10) Patent No.: US 10,476,820 B2
(45) Date of Patent: Nov. 12, 2019

(54) PROXY PRESENCE SERVER

(71) Applicant: Verizon Patent and Licensing Inc., Arlington, VA (US)

(72) Inventors: Christian D. Lair, Arlington, TX (US); Amol Tuli, Dublin, CA (US); Khalil M. Kajani, Carrollton, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 926 days.

(21) Appl. No.: 14/837,460

(22) Filed: Aug. 27, 2015

(65) Prior Publication Data
US 2017/0063739 A1 Mar. 2, 2017

(51) Int. Cl.
*H04L 12/58* (2006.01)
*H04L 29/08* (2006.01)

(52) U.S. Cl.
CPC ........... *H04L 51/043* (2013.01); *H04L 67/24* (2013.01); *H04L 67/303* (2013.01)

(58) Field of Classification Search
CPC ... H04L 67/24; H04L 65/1006; H04L 51/043; H04L 61/1529; H04L 61/1588; H04L 65/105; H04M 3/42365; H04M 3/42374; H04M 7/006; H04M 3/42
USPC ........................................................ 709/206
See application file for complete search history.

(56) References Cited

U.S. PATENT DOCUMENTS

| 8,204,052 B2 * | 6/2012 | Baldwin | H04L 67/24 370/389 |
| 2006/0155733 A1 * | 7/2006 | John | H04M 3/42374 |
| 2008/0285540 A1 * | 11/2008 | Burckart | H04L 67/24 370/351 |
| 2010/0017472 A1 * | 1/2010 | Benedyk | H04L 67/24 709/204 |
| 2010/0149975 A1 * | 6/2010 | Tripathi | H04L 67/04 370/230.1 |
| 2010/0226490 A1 * | 9/2010 | Schultz | H04M 3/5233 379/265.09 |
| 2011/0183645 A1 * | 7/2011 | Chawla | H04M 3/42357 455/410 |
| 2012/0173609 A1 * | 7/2012 | Kulaga | H04L 41/0816 709/203 |
| 2012/0284356 A1 * | 11/2012 | Luna | G06F 17/30902 709/213 |
| 2014/0071889 A1 * | 3/2014 | Aksu | H04L 29/06278 370/328 |

* cited by examiner

*Primary Examiner* — William G Trost, IV
*Assistant Examiner* — Imran Moorad

(57) ABSTRACT

A method includes receiving, from an external presence server at a proxy presence device, a presence status request for presence information associated with a user device in a home carrier network. The method includes sending the presence status request to an internal presence server in the home carrier network. The method also includes receiving the presence status of the user device and storing the presence status of the user device with a time to live (TTL) in an associated database. The presence status is sent to the external presence server. The method includes receiving at least one subsequent request for the presence status of the user device within a time window of the TTL. The method also includes sending the presence status within the time window of the TTL without sending another presence status request to the internal presence server.

20 Claims, 8 Drawing Sheets

PROXY PRESENCE SERVER

BACKGROUND

Presence servers may provide presence information regarding a potential communication partner to subscribing user devices. Presence information provides a status indication of the ability and interest of the potential communication partner to communicate with the subscribing user device. A subscribing user device (e.g., a user client) of the potential communication partner may provide the presence information to a presence service, which may store this presence information in a personal availability record (or presentity). The presence service may include one or more presence servers.

The subscribing user device may include a Rich Communication Service (RCS) enabled address book that may periodically query the presence service for capability information relating to subscribers. For example, the subscribing user device may request information whether the listed subscribers in the RCS enabled address book are high definition (HD) Voice enabled. In instances in which an RCS client (e.g., in the subscribing user device) has determined that a subscriber has enhanced services enabled, the RCS client will query the presence server again to determine if the subscriber is currently in a network that supports those enhanced services when that contact is accessed. The RCS client may thereby prevent issuing an invite that requires particular capabilities (e.g., an HD Voice invite) when the called party is roaming in coverage (e.g., 3G coverage) that does not support that particular capability.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may provide a proxy presence service for presence information associated with user devices in a home carrier network via a proxy presence server. The proxy presence server may act as an external interface for presence information to foreign carriers via networking protocols (e.g., transmission control protocol/Internet protocol (TCP/IP), internetwork packet exchange (IPX), etc.).

Consistent with embodiments described herein, the systems may cache presence information for subscribers for which the system has recently received queries for a predetermined amount of time. The cache may be configurable with a Time To Live (TTL). The systems and methods may retrieve capabilities data for every subscriber on a configurable interval. In instances in which another query is received for that particular subscriber, the query may be served directly from the proxy presence server, with no impact to an internal presence server. The internal presence server may receive, store, and transmit information about the presence or status of user devices associated with a home carrier network.

As used herein, the terms "user," "end user," "subscriber," and/or "customer" may be used interchangeably. Also, the terms "user," "end user," "subscriber," and/or "customer" are intended to be broadly interpreted to include a user device or a user of a user device.

Figure 1:
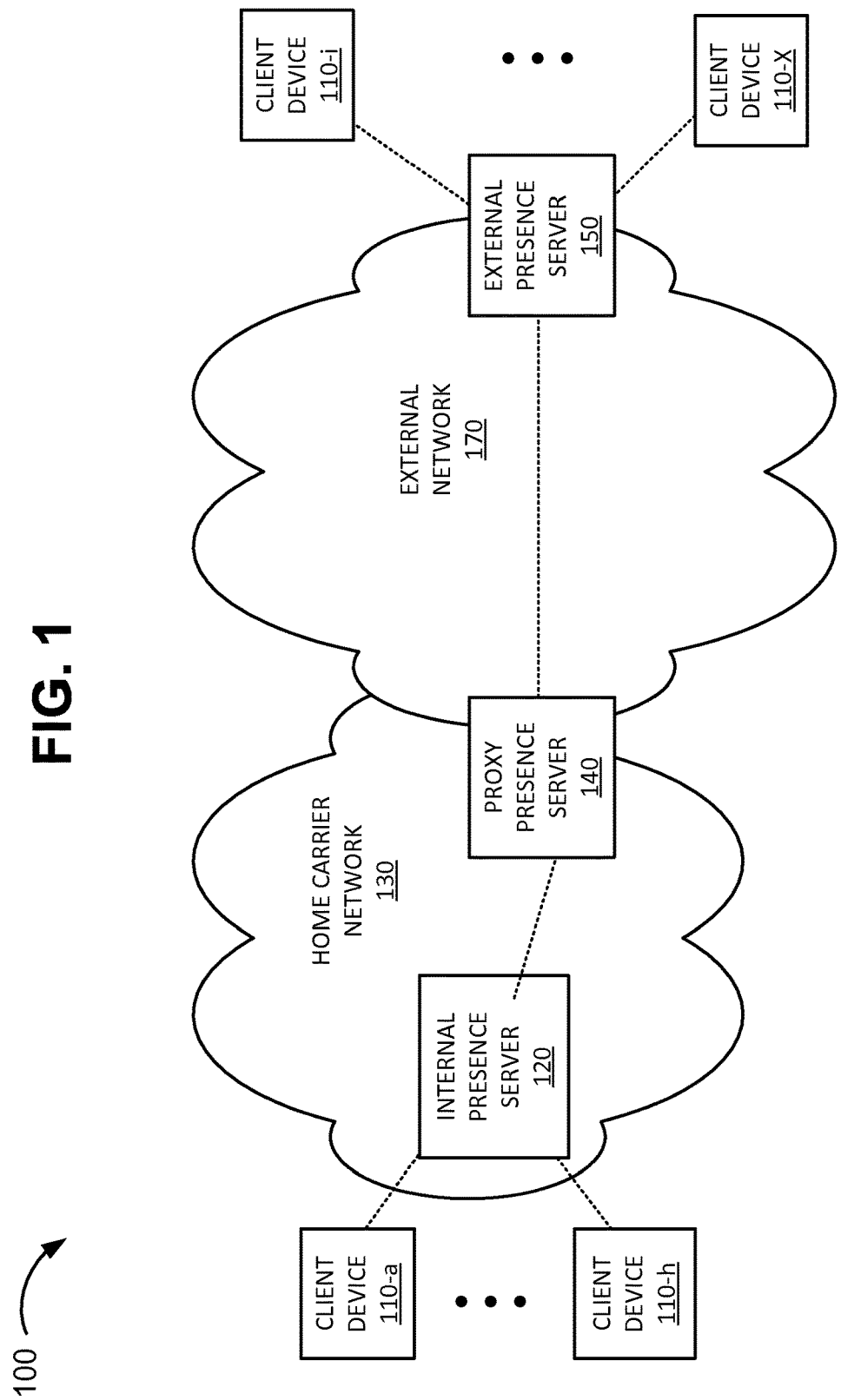
FIG. 1 illustrates an exemplary network in which systems and methods described herein may be implemented.

FIG. 1 is a block diagram of an exemplary network 100 in which systems and methods described herein may be implemented. Referring to FIG. 1, network 100 includes user devices 110-*a* through 110-*x* (referred to collectively as user devices 110 and individually as user device 110), an internal presence server 120, a home carrier network 130, a proxy presence server 140, an external presence server 150, and an external network 170. The particular arrangement and number of components of network 100 shown in FIG. 1 are illustrated for simplicity. In practice there may be more user devices 110, internal presence servers 120, proxy presence servers 140, external presence servers 150, and/or networks 130/170. Additionally, network 100 may contain fewer components, different components, differently arranged components, or additional components than depicted in FIG. 1. For example, although not shown, network 100 may include network devices, session initiation protocol (SIP) proxy devices, and other devices that facilitate voice over long term evolution (VOLTE) functions consistent with embodiments described herein. Components of network 100 may be connected via wired and/or wireless links.

User device 110 may include any type of device that is able to transmit and receive data, such as text data, video data, image data, audio data, multi-media data, etc. For example, user devices 110 may include some type of computer, such as a personal computer (PC), a tablet computer, a laptop computer, etc., a personal digital assistant (PDA), a web-based appliance, a mobile terminal (e.g., a cellular telephone), etc. User devices 110 may also include a telephone, such as a public switched telephone network (PSTN) based telephone, an Internet-protocol (IP) based phone, a wireless telephone, etc., used to make and receive telephone calls.

Furthermore, users of user devices 110 may be subscribers to telephony services provided in association with different carrier networks. As shown in FIG. 1, user devices 110 may be associated with different home carrier networks 130. For example, user devices 110*a*-110*h* may be associated with the home carrier network 130. User devices 110*n*-110*x* may be associated with external networks (or foreign networks) 170 to the home carrier network 130 of user devices 110*a*-110*c* and 110*d*-110*f*. Each of the user devices 110 may request presence information associated with subscribers listed in address books corresponding to the particular user device 110. The address book may include listed subscribers corresponding to user devices 110 associated with a home carrier network 130 or a foreign network (to home carrier network 130).

User devices 110 may perform a poll that is triggered based on the configuration of the client of the particular user device 110. Each vendor client may trigger a presence status poll of user devices 110*a*-*h* associated with home carrier network 130 with different criteria. The user device 110 may request presence information associated with each entry whenever the input provided by a user triggers polling of the particular entry. For example, some clients may poll each entry in the address book as a subscriber scrolls down their contact list on the user device 110. Other clients may only poll when the contact information for a particular entry is expanded to a detail level (e.g., prior to initiating a call, etc.).

Internal presence server 120 may receive, store, and transmit information about the presence or status of user devices 110 associated with a home carrier network 130. For example, internal presence server 120 may allow user devices 110 associated with a home carrier network 130 to publish their status information (busy, available, etc.) so that other user devices 110 may subscribe to the published presence information. The presence information may be used for the video portion of a VOLTE call or other enhanced voice services that require presence. Presence information may include capabilities of a subscriber to make video calls, whether the user device 110 includes a camera, whether the communication is covered under a subscriber plan associated with the user device 110, whether the user device 110 is currently in an LTE network, etc. In some embodiments, internal presence server 120 may implement the Extensible Messaging and Presence Protocol (XMPP) to publish and subscribe to presence information. Alternatively, internal presence server 120 may implement the Session Initiation Protocol (SIP) for Instant Messaging and Presence Leveraging Extensions (SIMPLE) for publishing and subscribing to presence information.

Home carrier network 130 may refer to a communications network provided and operated by the home carrier company for particular user devices 110 (e.g., user devices 110-*a* to 110-*h*). A carrier may refer to one or more of a mobile network operator (MNO), a mobile phone operator, a carrier service provider (CSP), a wireless service provider, a wireless carrier, a cellular company, and/or any other company that provides mobile phone service(s) to users (e.g., subscribers of the carrier) via a network. A carrier may also refer to a carrier network (e.g., a cellular network) provided and operated by the carrier company. Home carrier network 130 may include any cellular network (e.g., a mobile phone network) that provides cellular phone service to users (e.g., subscribers) of a particular carrier (from the perspective of the particular user devices 110*a*-*h*). Home carrier network 130 may provide cellular phone service within a particular geographical area (e.g., the United States of America (USA)). Home carrier network 130 may include a heterogeneous network that includes base stations of different types, including macro base stations and different types of small cells (not shown in FIG. 1). Home carrier network 130 may have no control over the frequency/volume of incoming requests for presence information from foreign carriers. Internal presence server 120 may have no control over how many presence requests are received by internal presence server 120 from user devices 110-*n*-110-*x* in an external network 170 to a home carrier network 130.

Proxy presence server 140 may perform as a proxy for presence information requests directed to user devices 110 in the home carrier network 130 from user devices in external network 170. Proxy presence server 140 may be deployed in a mobile carrier network, or into an IPX that connects mobile carrier networks to act as a cache and proxy for presence information requests that are directed towards internal presence server 120. The IPX may enable traffic between mobile carrier networks associated with different providers and systems to communicate data, and voice over internet protocol (VoIP) communications. Proxy presence server 140 may intercept presence requests directed towards internal presence server 120 for user devices 110 associated with the home carrier network 130. In some instances, proxy presence server 140 may relay information between external presence servers 150 and internal presence server 120. In other instances, proxy presence server 140 may receive presence requests that may include initial requests and periodic requests.

Proxy presence server 140 may perform as a proxy that makes a single query (for the presence status associated with a particular user device 110) to the internal presence server 120 for multiple presence requests received at proxy presence server 140. Proxy presence server 140 may publish and subscribe to presence information using a variety of protocols such as XMPP, SIP or SIMPLE. In some instances, a poorly configured RCS client for a user device 110 may query the home carrier's internal presence server 120 for a single subscriber multiple times a second. Proxy presence server 140 may reduce the workload on internal presence server 120 and prevent exhausting the capacity of internal presence server 120. Proxy presence server 140 may interact with devices and use information from an external network (e.g., an IPX-compliant system), such as external presence server 150.

External presence server 150 may be a presence server associated with users in an external network to home carrier network 130, such as external carrier network 170. External presence server 150 may relay requests for information about the presence or status of user devices 110-*a* to 110-*h* in home carrier network 130 from user devices 110-*n* to 110-*x*1 in external carrier network 170. User devices 110-*n* to 110-*x* may send out a presence request to other subscribing user devices 110 associated with an internal presence server 120. External presence server 150 may receive a request for presence status from user devices 110-*n* to 110-*x* in an external carrier network 170 to support particular services and capabilities. For example, the user device 110 may query whether a particular person (or particular user device 110) is available for a video call, whether the user device 110 is in an LTE network and whether the requested user device 110 has capability for the particular services that the requesting user device 110 is requesting with the particular user device 110.

External carrier network 170 may include a network that is external to and separate from home carrier network 130. For example, external carrier network 170 may include a wide area network (WAN), an intranet, a telephone network (e.g., the Public Switched Telephone Network), or a combination of networks. External carrier network 170 may include an IPX through which inter-carrier traffic is routinely routed. An IPX may treat all traffic (e.g., SIP traffic) as pass through traffic without differentiating between different types of traffic. External carrier network 170 may include, for example, an untrusted network, such as the Internet. External carrier network 170 may further include network devices such as routers, switches, and/or firewalls.

While FIG. 1 shows a particular number and arrangement of networks and/or devices, in practice, environment 100 may include additional networks/devices, fewer networks/ devices, different networks/devices, or differently arranged networks/devices than are shown in FIG. 1. For example, proxy presence server 140 may be implemented as part of an IPX or an external network.

In implementations described herein, systems may provide a proxy presence service associated with a home carrier network. The proxy presence service may receive requests for presence information from foreign carriers via an external network and request the presence information from an internal presence server associated with the home carrier. The proxy presence service may receive subsequent request for presence information. The proxy presence service may prevent inter-carrier communications for presence that may exhaust the capacity of multiple presence platforms in the home carrier network.

Figure 2:
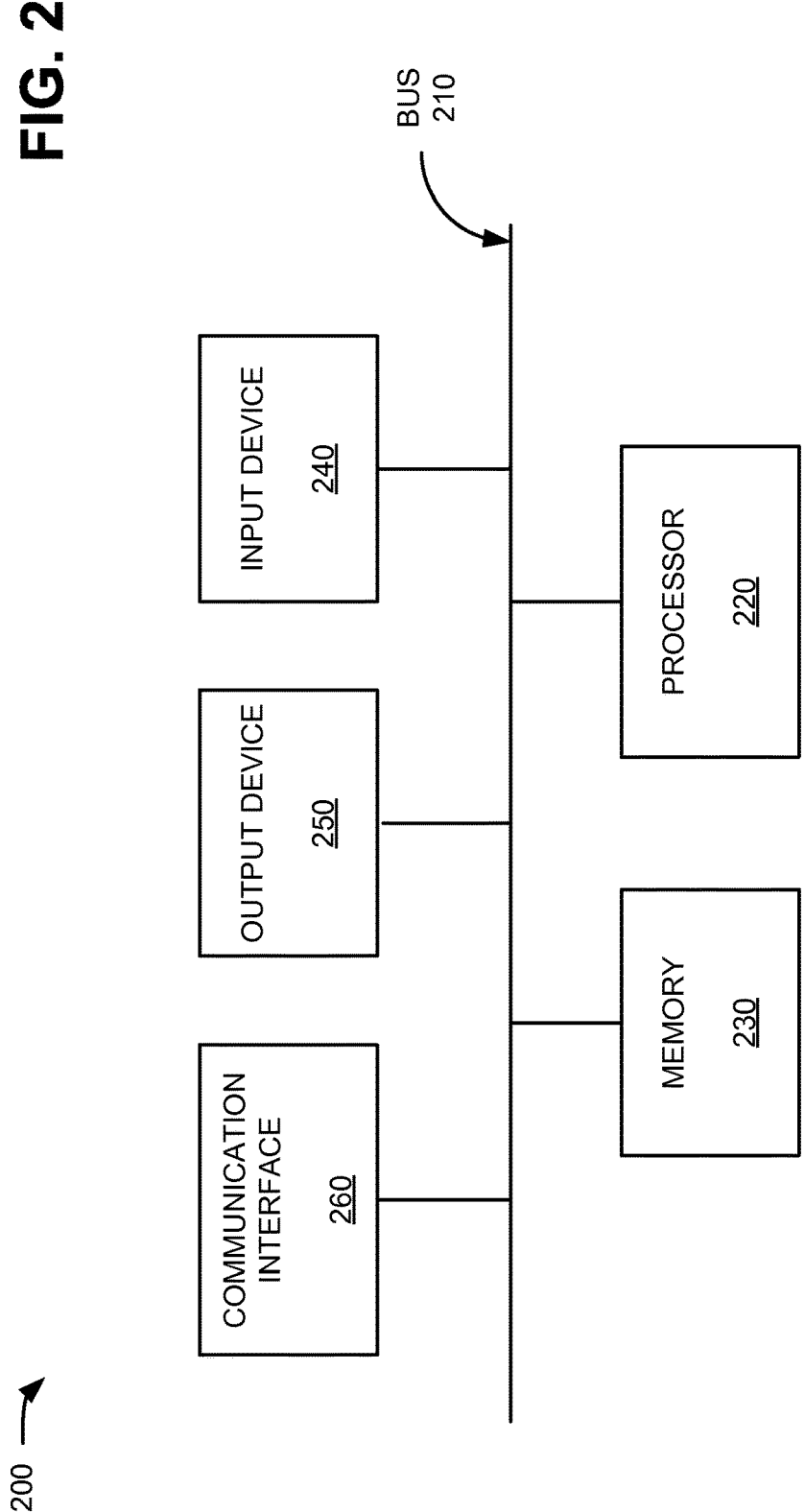
FIG. 2 illustrates an exemplary configuration of one or more of the components of FIG. 1.

FIG. 2 is a diagram of example components of a device 200. Each of internal presence server 120, proxy presence server 140 and/or external presence server 150, may include one or more devices 200. As shown in FIG. 2, device 200 may include a bus 210, a processor 220, a memory 230, an input device 240, an output device 250, and a communication interface 260.

Bus 210 may permit communication among the components of device 200. Processor 220 may include one or more processors or microprocessors that interpret and execute instructions. In other implementations, processor 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processor 220, a read only memory (ROM) or another type of static storage device that stores static information and instructions for the processor 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of network 100.

As described herein, device 200 may perform certain operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
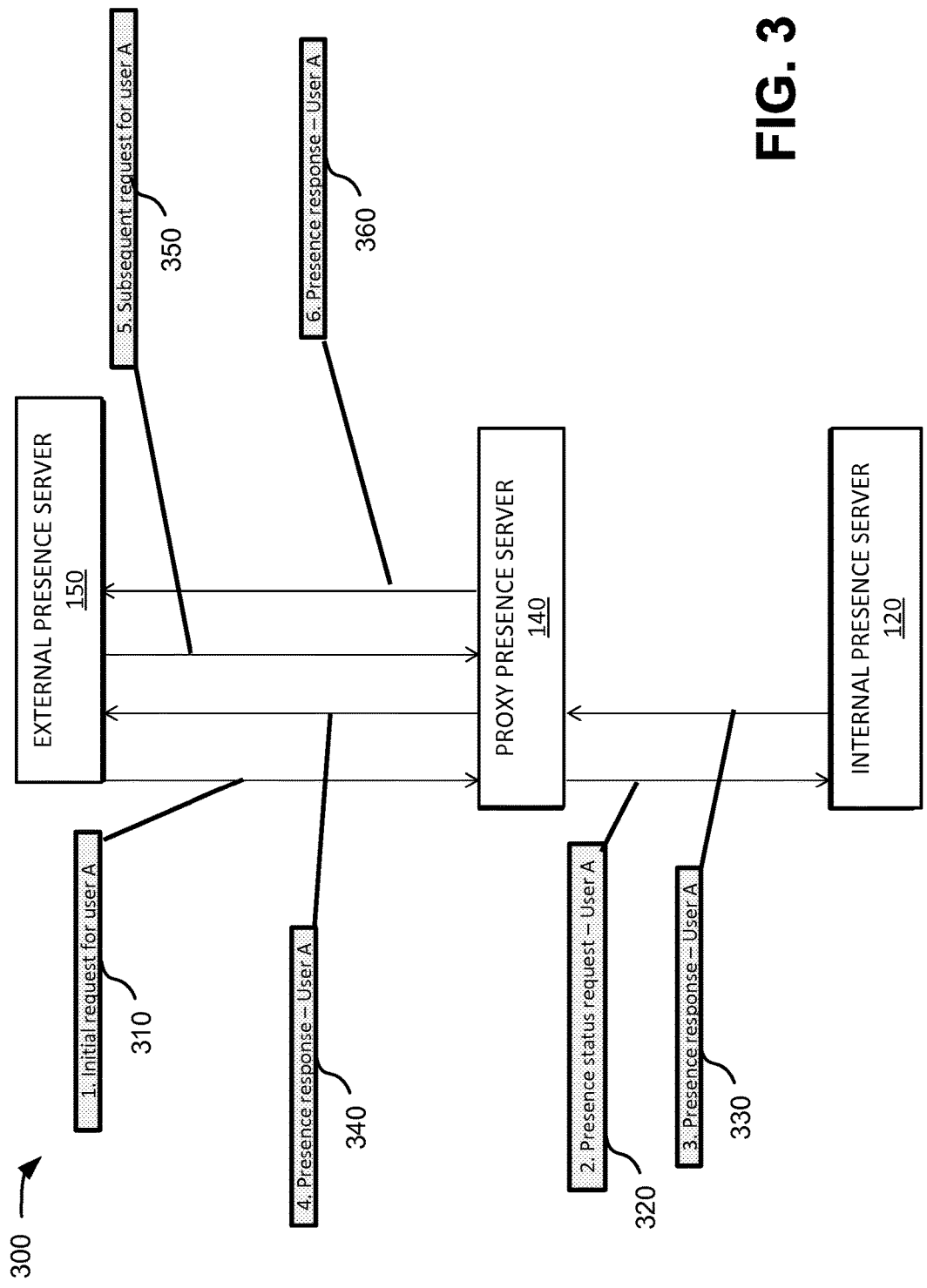
FIG. 3 is a diagram of communications to determine presence information associated with a user device in a home network via the proxy presence server of FIG. 1.

FIG. 3 is a diagram of communications to determine presence via the proxy presence server 120 of FIG. 1. As shown in FIG. 3, communications may include internal presence server 120, proxy presence server 140 and external presence server 150.

At step 310, communications may begin when an external user device 110 associated with a user (e.g., user X) in an external carrier network 170 (not shown in FIG. 3) sends a request for presence information associated with another user device 110 in home carrier network 130 (e.g., user A). An initial presence status request for user A may be routed through external presence server 150 and directed towards internal presence server 120. For example, external user device 110 may query whether user A is available and voice enabled. However, this presence status request may be re-routed and directed to proxy presence server 140 by home carrier network 130.

At step 320, proxy presence server 140 may determine that the received presence request is associated with a user device 110 in home carrier network 130 for which proxy presence server 140 does not have current presence information. Proxy presence server 140 may forward the presence request to internal presence server 120. Alternately, proxy presence server 140 may format an expanded request for presence information based on the presence request for user A and send the expanded request to internal presence server 120. As used herein, an expanded request may request additional information to that originally requested by the external user device 110.

At communications step 330, proxy presence server 140 may receive the requested presence information associated with user A from internal presence server 120. For example, internal presence server 120 may locate the presentity associated with user A and send a presence response with the requested presence information for user A to proxy presence server 140. Proxy presence server 140 may store the presence information associated with user A in a cache with a configurable TTL. The configurable TTL may be set to a particular time from the initial presence information is received.

Proxy presence server 140 may send the requested presence information for user A to external presence server 150 at step 340. External presence server 150 may forward the requested presence information for user A to the external user device 110 that requested the information.

At step 350, proxy presence server 140 may receive subsequent requests for presence information associated with user A. Proxy presence server 140 may receive subsequent request from different external user devices 110, which may be associated with the same external presence server 150 or different external presence servers 150.

Proxy presence server 140 may determine whether the requested presence information is stored in an associated cache. If so, proxy presence server 140 may determine whether the request has been received within the configurable TTL associated with the cached presence information. In instances in which the request has been received within the configurable TTL, proxy presence server 140 may send a presence response regarding user A to external presence server 150 based on the cached presence information, which may forward the presence status of user A to the requesting external user device 110.

Figure 4:
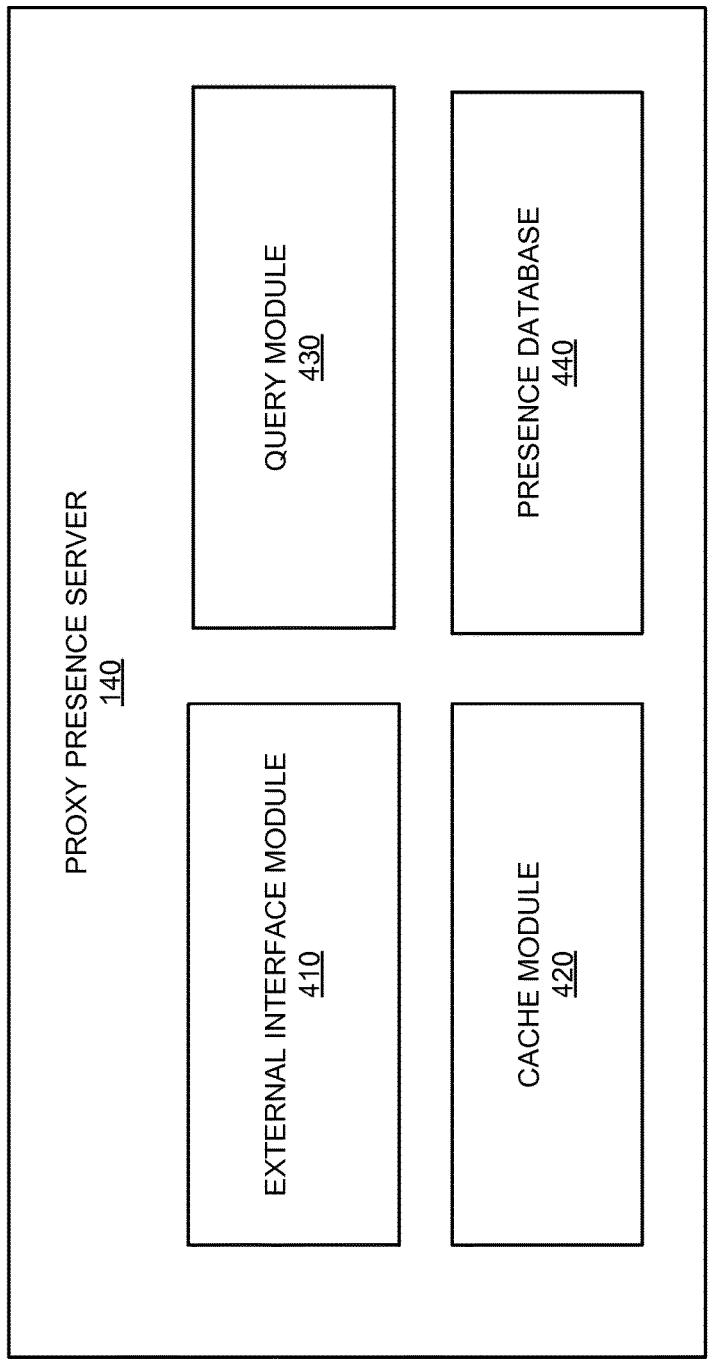
FIG. 4 is a diagram of exemplary functional components of the proxy presence server of FIG. 1.

FIG. 4 is a block diagram of exemplary functional or logical components of proxy presence server 140 (e.g., stored in memory 230 of proxy presence server 140). Proxy presence server 140 may include external interface module 410, cache module 420, query module 430 and a presence database 440. The configuration of components of proxy presence server 140 illustrated in FIG. 4 is for illustrative purposes. Proxy presence server 140 may include additional, fewer and/or different components than those depicted in FIG. 4.

External interface module 410 may function as an external interface for presence information to foreign carriers or IPX providers for example as described below with respect to FIG. 5. External interface module 410 may receive queries for presence information.

Cache module 420 may cache presence information for subscribers it has recently received queries for a set amount of time, such as described below with respect to FIG. 6. Cache module 420 may cache each presence entry associated with user devices 110 within the home carrier network 130 with a TTL in presence database 440.

Query module 430 may receive queries from foreign networks (e.g., external network 170) for the capabilities of a subscriber. Query module 430 may determine a response to the query based on whether the presence information is cached in presence database 440, such as described below with respect to FIG. 7. Query module 430 may serve the presence information and offload that demand from the internal presence server 120.

The configuration of components of proxy presence server 140 illustrated in FIG. 4 is for illustrative purposes. Other configurations may be implemented. Proxy presence server 140 may include additional, fewer and/or different components than those depicted in FIG. 4.

Figure 5:
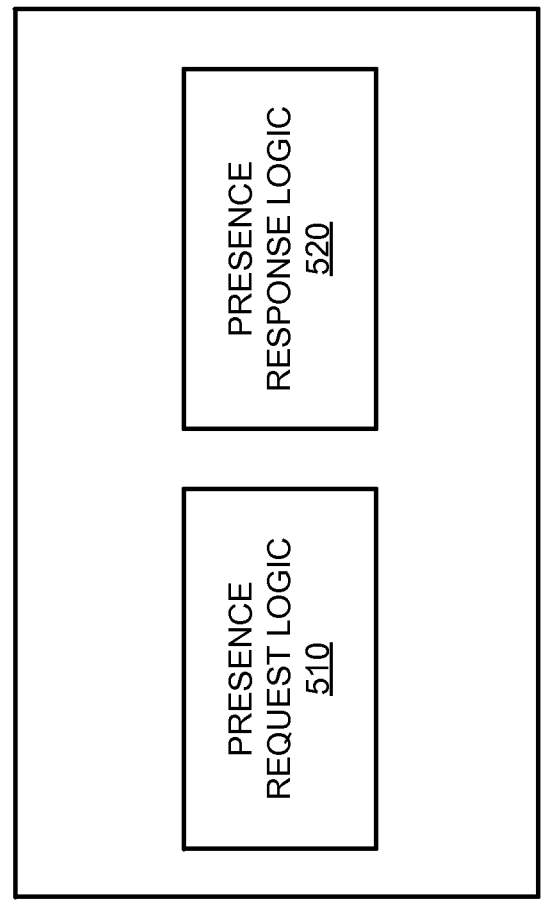
FIG. 5 depicts a functional block diagram of the external interface module of FIG. 4.

FIG. 5 is an exemplary functional block diagram of external interface module 410. As shown in FIG. 5, external interface module 410 may include presence request logic 510 and presence response logic 520.

Presence request logic 510 may receive communications from external presence servers 150 requesting presence information for user devices 110 in the home carrier network 130. Presence request logic 510 may forward the request to query module 430.

Presence response logic 520 may identify a requesting external presence server 150. Presence response logic 520 may provide a response to the presence status request to the identified external presence server 150. In some instances, presence response logic 520 may identify external presence servers 150 that request presence information above a predetermined threshold number of times within a time window (e.g., based on a poorly configured RCS client) and take appropriate action and/or provide an appropriate response to the external presence server 150.

Figure 6:
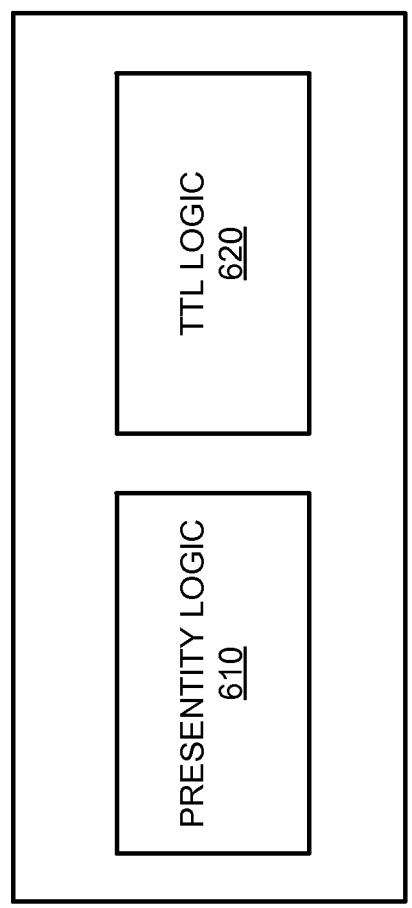
FIG. 6 depicts a functional block diagram of the cache module of FIG. 4.

FIG. 6 is an exemplary functional block diagram of cache module 420. As shown in FIG. 6, cache module 420 may include presentity logic 610 and TTL logic 620.

Presentity logic 610 may cache presence information for subscribers it has recently received queries for a set amount of time. Presentity logic 610 may assume responsibility for handling queries and allow the internal presence server to offload the demand for these queries from the home network served presence platform. Internal presence server 120 may focus available resources on serving subscribers within the home network. Presentity logic 610 may retrieve capabilities data for every subscriber on a configurable interval from internal presence server 120.

TTL logic 620 may provide a TTL and monitor each presentity based on the TTL. A presentity may include an entity that has presence information associated with it, such as status, reachability, etc. TTL logic 620 may receive instructions to configure the TTL from an administrator associated with the home carrier network 130. Presentity logic 610 may retrieve data once for all foreign carriers within the configurable TTL. TTL logic 620 may thereby prevent multiple retrievals by individual handsets (i.e., external user devices 110).

Figure 7:
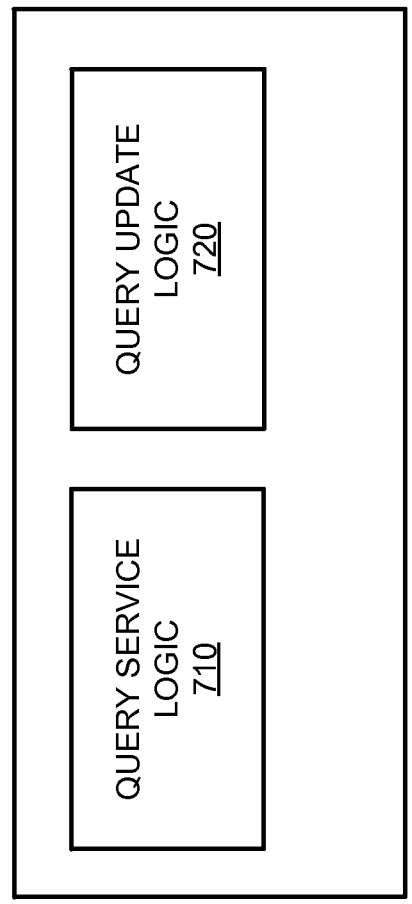
FIG. 7 depicts a functional block diagram of the query module of FIG. 4.

FIG. 7 is an exemplary functional block diagram of query module 430. As shown in FIG. 7, query module 430 may include query service logic 710 and query update logic 720.

Query service logic 710 may receive queries from external network 170 for the capabilities of a subscriber. Query service logic 710 may serve the presence information and offload that demand from the internal presence server 120. Query service logic 710 may access the cached presence information for that subscriber using a configurable TTL. If another query is received for that subscriber, query service logic 710 may serve the query directly, with no impact to the internal presence server 120.

Query update logic 720 may update presence information. In instances in which query module 430 is queried or notified of a subscribe (to the presence information for a user device 110) by a device outside of the home carrier network 130, query update logic 720 may query the internal presence server 120 and respond to the query.

Figure 8:
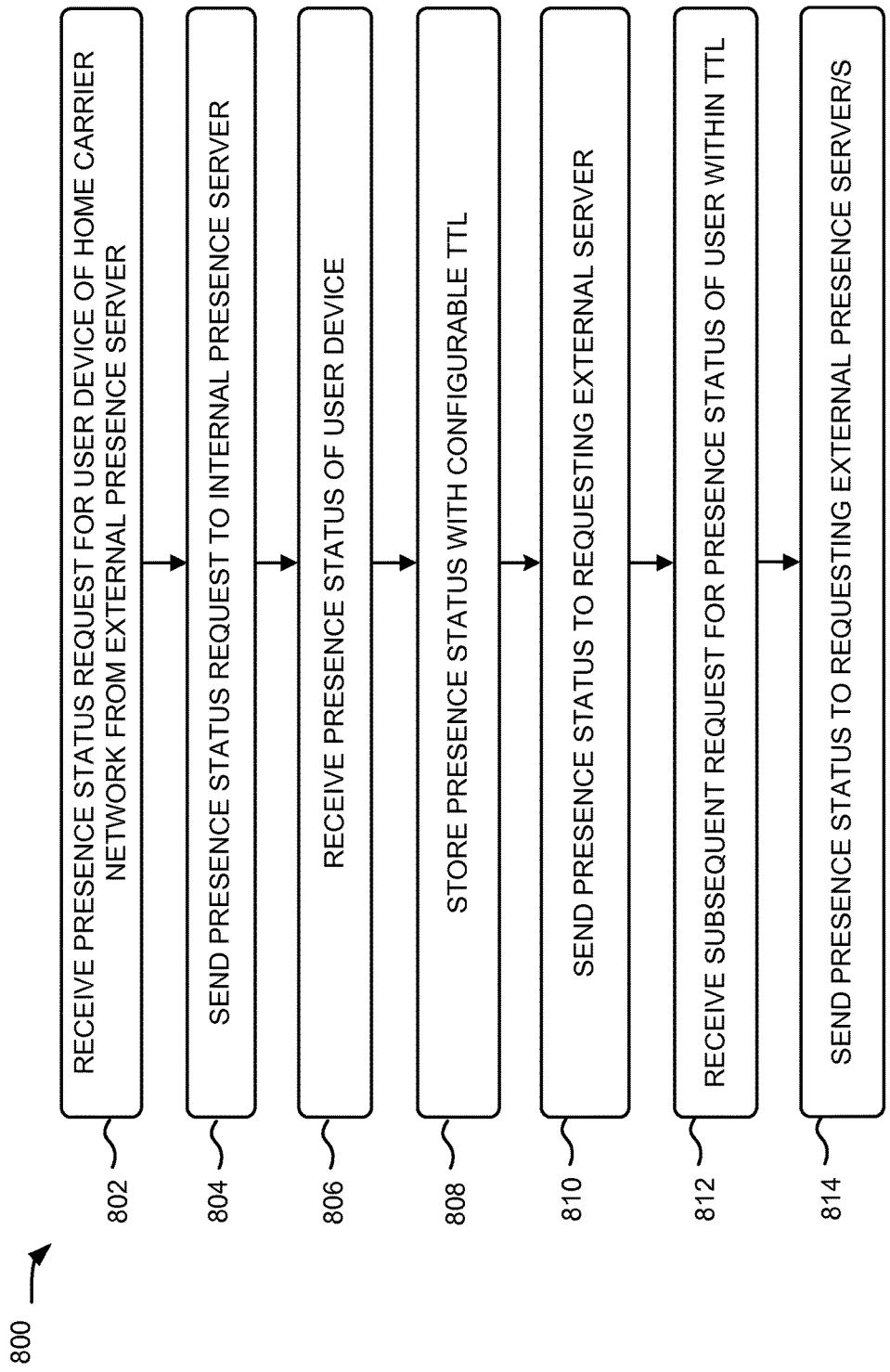
FIG. 8 is a flowchart of an exemplary process for providing a proxy presence service for a user device associated with a home carrier network.

FIG. 8 is a flowchart of an exemplary process 800 for providing a proxy presence service for a user device associated with a home carrier network. Process 800 may execute in proxy presence server 140. In another implementation, some or all of process 800 may be performed by another device or group of devices, including or excluding proxy presence server 140. It should be apparent that the process discussed below with respect to FIG. 8 represents a generalized illustration and that blocks/steps may be added or existing blocks/steps may be removed, modified or rearranged without departing from the scope of process 800.

At block 802, proxy presence server 140 may receive a presence status request for a user device 110 of home carrier network 130 from external presence server 150. The presence status request may include a request for information on multiple different types of presence based features. For example, the presence information may include RCS chat capability information. Additionally, the query may include whether the user device 110 is voice enabled and whether the user device 110 is in a network that supports enhanced services.

At block 804, proxy presence server 140 may send a presence status request to internal presence server 120. For example, proxy presence server 140 may identify a uniform resource locator (URL) associated with internal presence server 120 and forward the presence status request via the URL.

Proxy presence server 140 may receive the presence status of the user from internal presence server 120 (block 806). For example, internal presence server 120 may query the user device 110 regarding the requested presence information. Internal presence server 120 may send the current presence information to proxy presence server 140.

Proxy presence server 140 may store the presence information with a configurable TTL in an associated database (block 808). For example, proxy presence server 140 may store the presence information indexed with an identifier for user device 110 and other information associated with user device 110 (e.g., a network address, etc.). The presence information may includes whether a subscriber plan associated with the user device 110 covers the communication (i.e., the communication is of a type for which charges and other information are defined and recorded by the subscriber plan).

Proxy presence server 140 may send the presence status of the user to the requesting external presence server 140 (block 810). Proxy presence server 140 may send presence information requested by the external user device 110.

Proxy presence server 140 may receive subsequent requests for presence status of the user within the TTL (block 812). For example, another user device 110 (or the same external user device 110) may send a request through another external presence server 140 (or the same external presence server 140) for the presence status of the same user within the time window of the TTL. Proxy presence server 140 may determine whether a stored entry associated with the user for the presence status exists, and send a presence status request to the internal presence server 120 in response to a determination that a stored entry associated with the user device for the presence status does not exist. In instances in which presence RCS services are deployed, world wide mobile operators may have minimal or no insight into the number of foreign carrier subscribers that will populate the address books of home carrier subscribers. Proxy presence server 140 may allow the internal presence server 120 to allocate resources to providing presence status responses to home carrier subscribers.

Proxy presence server 140 may send the presence status of the user to all requesting external presence servers 140 within the TTL (block 814). Proxy presence server 140 may send the presence status response through another external presence server 140 (or the same external presence server 140) within the time window of the TTL.

Systems and/or methods described herein may receive requests for presence information from foreign carriers via an external network and request the presence information from an internal presence server associated with a home carrier. The systems may cache the presence information for a particular subscriber using a configurable TTL. The systems may receive subsequent requests for presence information and provide presence status response based on the stored presence information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the embodiments unless explicitly described as such. Also, as used herein, the articles "a", "an" and "the" are intended to include one or more items. Further, the phrase "based on" is intended to mean "based, at least in part, on" unless explicitly stated otherwise.

What is claimed is:

1. A computer-implemented method comprising:
receiving, from an external presence server at a proxy presence device, a presence status request from a rich communication service (RCS)-enabled client device for first presence information associated with a user device in a home carrier network;
determining, by the proxy presence device, that the first presence information is not stored in an associated database;
generating, by the proxy presence device and based on the determining, an expanded presence status request requesting the first presence information and second presence information associated with the user device with respect to the home carrier network;
sending the expanded presence status request to an internal presence server in the home carrier network;
receiving an expanded presence status of the user device, wherein the expanded presence status includes the first presence information and the second presence information;
storing the expanded presence status of the user device with a time to live (TTL) in the associated database;
sending the first presence information to the external presence server;
receiving multiple subsequent requests from the RCS-enabled client device for a presence status of the user device within a time window of the TTL;
identifying, based on the multiple subsequent requests exceeding a threshold number of requests within the time window, the RCS-enabled client device as being improperly configured; and
notifying the external presence server that the RCS-enabled client device is improperly configured.

2. The computer-implemented method of claim 1, wherein receiving the presence status request further comprises:
receiving a request for rich communication services.

3. The computer-implemented method of claim 1, wherein receiving the presence status request further comprises:
receiving a query whether the user device is voice enabled.

4. The computer-implemented method of claim 1, wherein receiving the presence status request further comprises:
receiving a query whether the home carrier network network supports enhanced services.

5. The computer-implemented method of claim 1, further comprising:
receiving at least one request from a different external presence server than the external presence server.

6. The computer-implemented method of claim 1, further comprising:
retrieving capabilities data for the user device on a configurable interval.

7. The computer-implemented method of claim 1, wherein the proxy presence device is configured to use Extensible Messaging and Presence Protocol (XMPP) to publish and subscribe to the first presence information and the second presence information.

8. The computer-implemented method of claim 1, wherein the first presence information includes whether a subscriber plan associated with the user device covers RCS.

9. The computer-implemented method of claim 8, wherein the second presence information is associated with a video portion of a voice over long term evolution (VOLTE) call.

10. The computer-implemented method of claim 8, wherein the second presence information includes whether the user device includes a camera.

11. The computer-implemented method of claim 1, wherein sending the expanded presence request comprises:
determining a uniform resource locator (URL) associated with the internal presence server; and
sending the expanded presence status request to the internal presence server via the URL.

12. A device, comprising:
a communication interface;
a memory to store a plurality of instructions; and
a processor configured to execute the instructions in the memory to:
receive, via the communication interface from an external presence server, a presence status request from a rich communication service (RCS)-enabled client device for first presence information associated with a user device in a home carrier network;
determine that the first presence information is not stored in an associated database;
generate, based on the determination, an expanded presence status request requesting the first presence information and second presence information associated with the user device with respect to the home carrier network;
send, via the communication interface, the expanded presence status request to an internal presence server in the home carrier network;
receive, via the communication interface, an expanded presence status of the user device, wherein the expanded presence status includes the first presence information and the second presence information;
store the expanded presence status of the user device with a time to live (TTL) in the associated database;
send, via the communication interface, the first presence information to the external presence server;
receive, via the communication interface, multiple subsequent requests from the RCS-enabled client device for a presence status of the user device within a time window of the TTL;
identify, based on the multiple subsequent requests exceeding a threshold number of requests within the time window, the RCS-enabled client device as being improperly configured; and
notify, via the communication interface, the external presence server that the RCS-enabled client device is improperly configured.

13. The device of claim 12, wherein, when receiving the presence status request, the processor is further to:
receive a request for rich communication services.

14. The device of claim 12, wherein when receiving the presence status request, the processor is further to:
receive a query whether the user device is voice enabled.

15. The device of claim 12, wherein when receiving the presence status request, the processor is further to:
receive a query whether the home carrier network supports enhanced services.

16. The device of claim 12, wherein the processor is further to:
receive at least one request from a different external presence server than the external presence server.

17. The device of claim 12, wherein the device is configured to use Extensible Messaging and Presence Protocol (XMPP) to publish and subscribe to the first presence information and the second presence information.

18. A non-transitory computer-readable medium including instructions to be executed by a processor, the instructions including one or more instructions, when executed by the processor, for causing the processor to:
receive, from an external presence server, a presence status request from a rich communication service (RCS)-enabled client device for first presence information associated with a user device in a home carrier network;
determine that the first presence information is not stored in an associated database;
generate, based on the determination, an expanded presence status request requesting the first presence information and second presence information associated with the user device with respect to the home carrier network;
send the expanded presence status request to an internal presence server in the home carrier network, wherein the expanded presence status includes the first presence information and the second presence status information;
receive an expanded presence status of the user device;
store the expanded presence status of the user device with a time to live (TTL) in the associated database;
send the first presence information to the external presence server;
receive multiple subsequent requests for a presence status of the user device within a time window of the TTL;
identify, based on the multiple subsequent requests exceeding a threshold number of requests within the time window, the RCS-enabled client device as being improperly configured; and
notify the external presence server that the RCS-enabled client device is improperly configured.

19. The non-transitory computer-readable medium of claim 18, wherein, when receiving the presence status request, the one or more instructions further includes instructions for causing the processor to:
receive a request for rich communication services.

20. The non-transitory computer-readable medium of claim 18, wherein, when receiving the presence status request, the one or more instructions further includes instructions for causing the processor to:
receive a query whether the user device is voice enabled.

* * * * *